Aug. 29, 1939.    R. E. KELLER    2,170,926
AUTOMATIC TRANSMISSION
Original Filed March 26, 1934    2 Sheets-Sheet 2

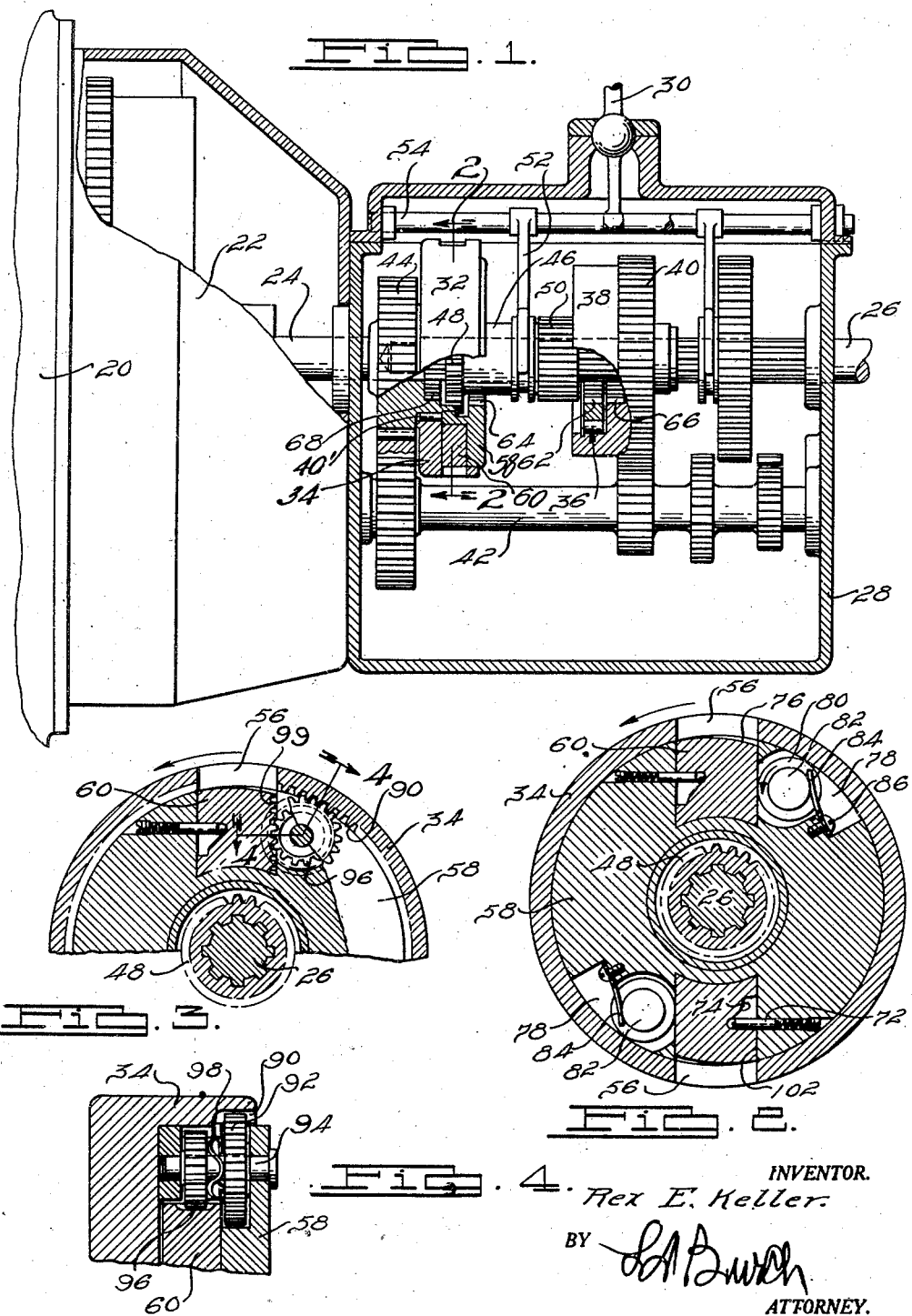

INVENTOR.
Rex E. Keller.
BY
ATTORNEY.

Patented Aug. 29, 1939

2,170,926

UNITED STATES PATENT OFFICE 2,170,926

AUTOMATIC TRANSMISSION

Rex E. Keller, Beverly Hills, Calif.

Application March 26, 1934, Serial No. 717,380
Renewed January 27, 1939

13 Claims. (Cl. 192—105)

This invention relates to power transmitting mechanisms and particularly to mechanisms of that class having automatically operable means for effecting changes in the ratio of a driving connection between driving and driven shafts.

This invention contemplates the provision of a transmission mechanism provided with control means whereby the operation of the automatic means for effecting changes in the gear ratio may be delayed until certain conditions of car performance have been attained.

In the form selected for the purposes of illustrating the invention, a selective change speed gearing adaptable for use in automotive vehicles is disclosed embracing one form of the invention. For effecting automatic changes in the ratio of the driving connection between driving and driven shafts of the transmission, a centrifugally operable clutch is provided having a drum-shaped clutch member provided with one or more bolt-engaging recesses, a core clutch member nested within said drum-shaped clutch member and provided with one or more locking bolts movable into said recesses for interconnecting said clutch members, means affording a one-way driving connection between the driving and driven shafts to which the clutch members are connected, respectively, and operable for initiating the rotation of the driven shaft and driving the clutch member associated therewith at a lower rate of rotation than the clutch member associated with the driving shaft, and means responsive to relative rotation between said clutch members for holding said positive locking bolt out of said recesses until the rotative speeds of said clutch members have been substantially synchronized.

A principal object of the invention is to provide means responsive to the relative rotation between said clutch members for holding said locking bolt in an inoperative position as long as such relative rotation exists, whereby the operation of the centrifugally actuated clutch to effect automatic changes in the ratio of the driving connection between the driving and the driven shafts will be delayed until synchronization of the clutch members is first brought about, which may be accomplished incidental to a closing of the throttle controlling the speed of the engine.

Other objects and advantages will be apparent from a reference to the following specification taken in conjunction with the accompanying drawings, of which there are two sheets and in which:

Fig. 1 is a side elevational view, partly in section, of a portion of an automotive vehicle and illustrating the application of my invention to a selective change speed gearing thereof;

Fig. 2 is a vertical cross sectional view taken in a plane on the line 2—2 of Fig. 1 and illustrating the centrifugally actuated clutch in detail;

Fig. 3 is a view similar to Fig. 2 of a modified form of clutch mechanism;

Fig. 4 is a sectional view taken along the line 4—4 of Fig. 3;

Figure 6:
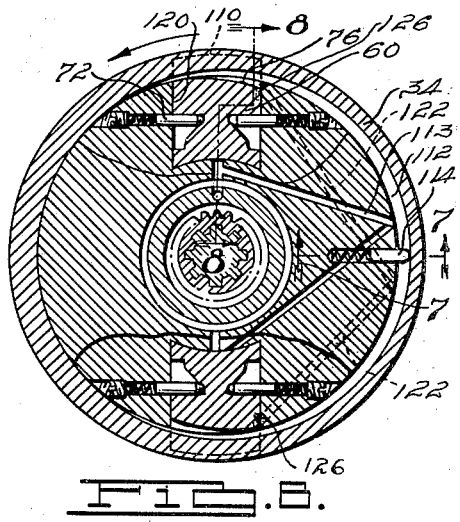
Figure 8:
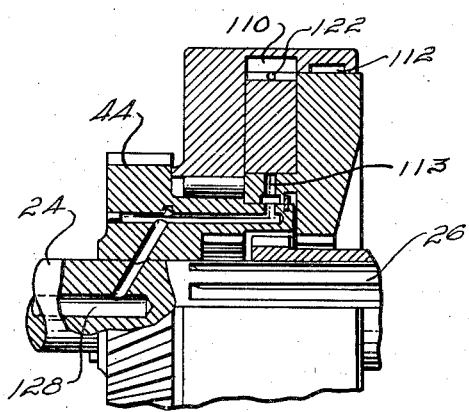
Figure 7:
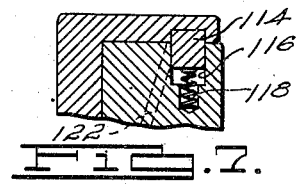
Figure 11:
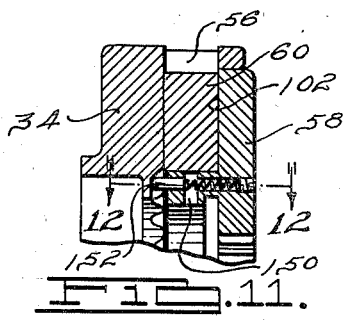
Figure 12:
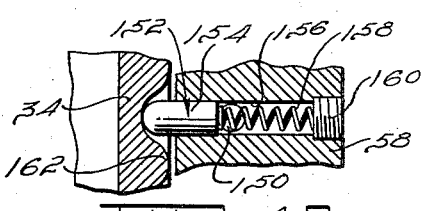

Figs. 7 and 8 are detail sectional views taken in planes on the lines 7—7 and 8—8, respectively, of Fig. 6; and Fig. 12 is a detail sectional view taken in a plane on the line 12—12 of Fig. 11.

Referring now to Fig. 1 of the drawings, there is shown more or less diagrammatically a side elevational view of a portion of an automotive vehicle having an engine 20, a housing-enclosed clutch mechanism 22, a driving shaft 24 adapted to be connected to the engine 20 by the housing-enclosed clutch mechanism 22, a driven shaft 26 operatively connected to the road wheels of the vehicle, a selectively operable change speed gearing 28 adapted to effect changes in the ratio of the driving connection between the driving and the driven shafts, and a manually operable shift lever 30 for selecting the changes in the gearing.

The change speed gearing 28 includes a centrifugally actuated clutch 32 having a driving element 34 operatively connected with the driving shaft 24, an over-running clutch 36 having the driving element 38 thereof operatively connected to a gear 40 rotatably mounted upon the driven shaft 26 and operatively connected through a train of gears afforded by a countershaft gear cluster 42 with a drive gear 44 fixed for rotation with the driving shaft 24, and a slidable clutch sleeve 46 splined to the driven shaft 26 and having toothed clutch elements 48 and 50 formed on each end thereof which are adapted to be coupled with cooperating clutch elements associated with drive gear 44, centrifugally actuated clutch 32, over-running clutch 36, and gear 40. A yoke 52, fixed for movement with a shifter rod 54 which is adapted to be moved by shift lever 30, is provided for shifting clutch sleeve 46. It will be noted that an overrunning clutch 40' may be, if desired, provided between the clutch drum 34 and drive gear 44 so that the clutch drum may overrun said gear, said overrunning clutch being of the roller type, as disclosed in my patent for Transmission mechanism, Number 1,969,561, issued August 7, 1934.

The centrifugally actuated clutch 32 includes a drum-shaped driving element 34 provided with one or more bolt-engaging recesses 56, a core or driven member 58 nested within the drum 34 and adapted to be operatively connected to the driven shaft 26 by clutch sleeve 46, one or more movable bolts 60 slidable mounted in a suitable groove or channel in the core or driven member 58 and movable from the position in which it is shown in Fig. 2 of the drawings outwardly under the influence of centrifugal force resulting from rotation of the core 58 and into a bolt-engaging recess 56 for connecting the core 58 to the drum 34 for rotation therewith. During such time as the overrunning clutch 36 is operative for driving the driven shaft 26, the core 58 of the centrifugally actuated clutch will be rotating at a lower rate of speed than that of the drum 34, on account of the speed reduction provided by the countershaft gear train 42.

Movement of clutch sleeve 46 to the right to couple toothed clutch element 50 thereof with the teeth 62 formed on the driven element of the overrunning clutch 36 will connect the driven shaft 26 to the driving shaft 24 through the intermediary of sleeve 46, overrunning clutch 36, and gears 40 and 44, which are interconnected by the countershaft gear train 42. Toothed clutch element 48 is adapted to be coupled with teeth 64 formed on clutch core 58 incidental to the coupling of the toothed clutch element 50 with the teeth 62 formed on the driven element of the overrunning clutch 36. Gears 40 and 44 are each provided with an internal set of teeth 66 and 68, respectively, which are adapted to be selectively coupled with the toothed clutch elements 50 and 48, respectively, provided on the clutch sleeve 46 for providing two-way driving connections between gears 40 and 44 and the driven shaft 26, respectively.

For the purpose of holding the bolts in their inward or retracted position until the core 58 has attained a predetermined speed of rotation, there is provided a suitable spring-pressed poppet 72, mounted in the body of the core 58 and the head of which is engageable with a cam surface 74 formed in a side portion of the bolt 60 so that the same will not move under the influence of centrifugal force until the amount thereof is greater than that of the spring-pressed poppet 72 which is also operable for retracting said bolt 60 when the centrifugal force thereof falls below that exerted by the spring-pressed poppet.

Each of the bolts 60 is provided with a cammed or beveled face 76 which rides on the inside surface of the drum 34 and which is adapted for preventing the movement of the bolt 60 into one of the recesses 56 until the relative rotation between the core 58 and drum 34 has been eliminated, which may be effected by decelerating the speed of rotation of the drum 34 which, on account of the interposition of the overrunning clutch 36 in the driving connection between the shafts, will be free to be decelerated without directly affecting the speed of the core 58 which at such time will coast under the influence of the road wheels of the vehicle.

For the purpose of aiding in holding bolt 60 out of the bolt-engaging recesses 56 and for eliminating the noise created by the bolt 60 in jumping the recesses 56 during such time as the drum member 34 is rotating at a rate in excess of that of the core 58 and the bolt tends to fly outwardly, there is provided a means operable responsive to the relative rotation between said drum member and said core member and acting on said bolt for holding the same in its retracted position.

In the embodiment disclosed in Fig. 2, the core member 58 on one side of the groove 102 in which the bolt 60 is slidably mounted and on the side opposite to that of the spring-pressed poppet 72, is provided with a chamber 78 in which there is disposed a cylindrical roller 80 having a hub portion 82 upon which the free end of a leaf spring 84 bears, which leaf spring may be secured to the body of core member 58 by a suitable bolt 86.

The roller 80, biased into engagement with one side of the bolt 60 by the leaf spring 84, will also be in contact with the inner cylindrical surface of the drum member 34 during such time as the core 58 is rotating, since the centrifugal force of the roller 80 will cause the same to ride on the inner cylindrical surface of the drum member 34. During such time as relative rotation exists between the drum member 34 and the core 58, the roller 80 will be rotated about its own axis and will roll upon the inner cylindrical surface of the drum 34, the centrifugal force of the roller 80 being greater than the force of the leaf spring 84. However, during such time as the roller 80 is rolling upon the internal surface of the drum member 34, the leaf spring 84 will bias said roller into engagement with the side of the bolt 60, as a result of which the bolt 60 will be held in its retracted position so long as the relative rotation in the direction indicated by the arrow in Fig. 2 exists between the drum member 34 and the core member 58.

The roller 80, in rolling upon the internal cylindrical surface of the drum member 34, will tend to be carried therewith, as a result of which the frictional contact between the roller 80 and the side of the bolt 60 will be sufficient to cause the rotation of the roller 80 to hold the bolt 60 in its retracted position. When the relative rotation between the drum 34 and the core 58 has been eliminated, such as by decelerating the speed of the drum 34, the rotation of the roller 80 will cease, and the bolt 60 will be projected into one of the recesses 56 to provide a driving connection between the driving and the driven shafts through the centrifugally actuated clutch 32 and around the overrunning clutch 36, the driving connection through the centrifugally actuated clutch 32 being operable to drive the driven shaft 26 at a higher rate of rotation relative to that of the driving shaft 24 than that at which said driven shaft would be driven through said overrunning clutch 36.

In Figs. 3 and 4 there is disclosed a modified form of construction for holding the bolt 60 in its retracted position until the relative rotation between the core 34 and drum 58 has been eliminated, which comprises the provision of an internal set of teeth 90 upon the inner surface of the drum 34, with which a gear 92, mounted for rotation upon a shaft 94 carried by the core 58, is in mesh. A second gear 96 also mounted upon shaft 94 is adapted to mesh with a set of rack teeth 99 formed on one side of the bolt 60. Between the gears 92 and 96 and about the shaft 94 there is disposed a fluted friction disk 98 which is in frictional engagement with each of the gears 92 and 96 and tends to rotate the gear 96 with the gear 92 which is rotated by the drum 34 during such time as it is rotating at a rate in excess of that of the core member 58 upon which the gear 92 is mounted. So soon as the relative rotation between the drum 34 and the core 58 is eliminated, the centrifugal force of the bolt 60 will be operative for moving the same into one of the bolt-engaging recesses 56. It will be apparent that during such time as the relative rotation between the drum 34 and the bolt 58 exists that the frictional drag between the gears 92 and 96 will be sufficient to hold the bolt 60 in its retracted position. In general, the operation of a device constructed in accordance with this modification will be similar to that of the modification illustrated in Fig. 2.

Figure 5:
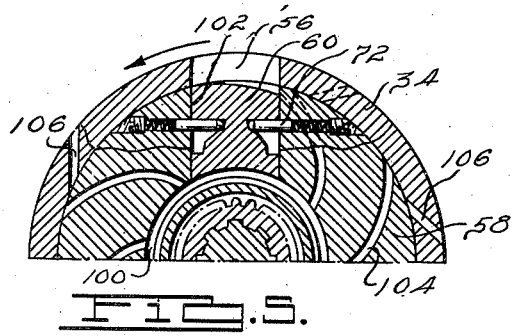
Figs. 5, 6, 9, 10 and 11 are detail sectional views of several other modifications of the invention.

In the modification disclosed in Fig. 5 of the drawings, the core member 58 is provided with an annular chamber 100 which is in communication with the groove 102 in which the bolt 60 is slidably disposed at the under side thereof. The core 58 is further provided with a series of curved passageways 104 all of which at one end are in communication with the chamber 100 and the other end of which terminates in the peripheral surface of the core 58. The drum 34 within which the core 58 is nested is provided with a plurality of ducts or passageways 106 which extend through the body of the drum 34 at such an angle that the rotation of the drum member 34 in the direction indicated by the arrow in Fig. 5, will tend to reduce the pressure within such ducts or passageways 106, particularly since the drum member 34 is adapted to rotate in an oil bath.

The annular chamber 100 and the ducts or passageways 104 are adapted to be filled with an oil or other liquid so that upon rotation of the core member 58 such liquid will be thrown outwardly from the annular chamber 100 under the influence of centrifugal force, as a result of which a reduced pressure will exist within said chamber 100. During such time as the drum member 34 is overrunning the core member 58, the reduced pressure within the ducts or passageways 106 will be communicated to the ducts 104 for the purpose of further tending to withdraw the liquid therefrom, as a result of which the pressure within the annular chamber 100 will be still further reduced. The reduced pressure within the annular chamber 100 will cause the bolt 60 to be held in its retracted position until such overrunning of the drum 34 is eliminated when the reduced pressure within the ducts will not be communicated to the passageways 104 at such times as the groove 102 lines up with one of the bolt-engaging recesses 56.

While the reduced pressure within the annular chamber 100 resulting from the outward movement of the liquid in the ducts 104 under the action of centrifugal force will be insufficient to hold the bolt 60 in its retracted position after the rotative speed of the core 58 is sufficient to overcome the force of the spring-pressed poppet 72, the communication of the reduced pressure within the passageways 106 to the annular chamber 100 during such time as relative rotation exists between the drum 34 and the core member 58 will be sufficient to hold the bolt 60 in its retracted position.

In the modification disclosed in Figs. 6, 7 and 8, the drum member 34 is provided with a bolt-engaging recess 110 which is closed to atmosphere and with an eccentric groove 112 also closed to atmosphere and which forms a chamber in which a blade 114 carried by a core member 58 operates for building up a pressure on one side of the blade and for creating a reduced pressure on the other side of the blade within the eccentric groove 112 as the blade moves from one end to the other end thereof. The blade 114 is reciprocably mounted in a slot 116 provided in the body of the core member 58 and biased by a spring 118 into the eccentric groove 112. The core member 58 is provided with ducts 113 communicating at one end with that portion of the chamber 112 on one side of the piston blade 114 and at the other end thereof with the closed portion of the groove 120 on the under side of the bolt 60 in which the same is slidably mounted. The core member 58 is provided with a second set of ducts 122 in communication with that portion of the chamber 112 on the opposite side of the piston blade 114 and with the enclosed bolt-engaging recesses 110.

During such time as the drum member 34 is overrunning the core member 58, the piston blade 114 will pass through the eccentric groove 112 from one end thereof to the other end thereof, as a result of which the fluid which is contained within the ducts and ahead of the blade 114 will be placed under pressure for the purpose of building up a pressure head within the enclosed bolt-engaging recesses 110 with which such portion of the chamber 112 is in communication through the ducts 122. The pressure built up within the enclosed bolt-engaging recess 110 will act on the bolt 60 whenever the same passes under such recess for resisting the outward movement of the bolt 60 under the influence of centrifugal force.

As the piston blade 114 is passed through the eccentric groove 112, that portion thereof behind the blade 114 will gradually expand in volume, causing a reduction in pressure within such portion of the chamber and the associated ducts 113, with the result that bolt 60 will tend to remain in the position in which it is shown in Fig. 6 of the drawings. As soon as the relative rotation between the drum 34 and core 58 has been eliminated, no further pressure will be developed to oppose movement of the bolt 60 under the action of centrifugal force, with the result that when the bolt 60 lines up with one of the bolt-engaging recesses, it will move into the same for interconnecting said clutch members. The ducts 122 terminate in one side wall of the groove in which the bolt 60 is slidable, and on that side of the bolt, in order that the end of the ducts 122 be not covered by a partial movement of the bolt 60, the same is provided with a slot 126, which will afford communication between the duct 122 and the bolt-engaging recess 110 in the event that the bolt is moved slightly outwardly from the position in which it is shown in Fig. 6 of the drawings.

For the purpose of retracting the bolt from engagement with the bolt-engaging recess above the speed at which the same is moved inwardly normally by the spring-pressed poppet 72, the driving shaft 24 and gear 44 may be bored to provide a suitable duct 128 communicating with the duct 113 and through the same with the under side of the bolt 60. Such duct or passageway 128 may be in communication with any suitable source of vacuum such as the intake manifold of the engine of the vehicle, whereby the suction within the same may be applied through said passageway 128 to act on bolt 60 for moving the same inwardly and against the action of centrifugal force for the purpose of moving the bolt 60 out of engagement with the bolt-engaging recess to disconnect the core 58 from the drum 34.

If the bolt 60 is moved to break the connection between the drum 34 and the core 58, the direct driving connection between the driving and the driven shafts will be broken, and the overrunning clutch 36 will be operative for driving the driven shaft 26 through the same.

Figure 9:
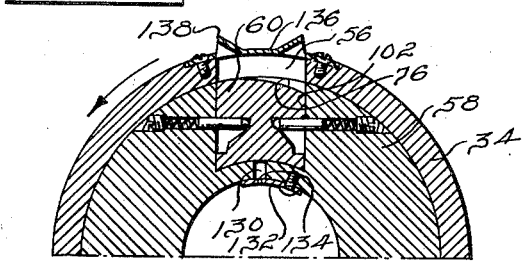

In the modification disclosed in Fig. 9, the groove 102 in the core 58 in which the bolt 60 is slidably disposed is in communication at the bottom thereof with a duct 130 closed by a flap valve 132 having a restricted orifice 134 through the same so that a slow leakage of oil or other fluids occurs into the bottom portion of the groove 102 for resisting a rapid outward movement of the bolt under the action of centrifugal force while permitting a practically unrestricted flow of fluid from the bottom end of the groove 102 when the bolt 60 moves inwardly. The drum 34 may, if desired, be provided with a plate 136 having baffles 138 for deflecting oil into the bolt-engaging recess 56 upon rotation of the drum 134 in a body of oil. The oil deflected into the bolt-engaging recess 56 will tend to cushion the impact of the bolt 60 upon the internal surface of the drum 34 during such time as the drum 34 is overrunning the core 58 and the bolt is unable to move into said recess on account of the bevel 76 on the face of the bolt 60.

Figure 10:
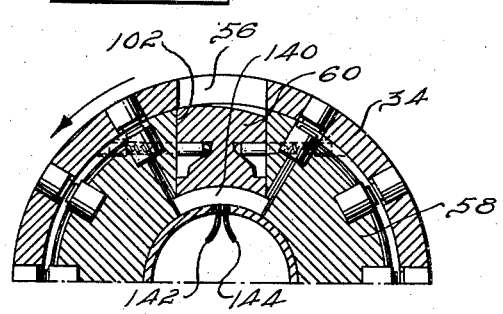

In Fig. 10 there is illustrated a modification in which the essentials of a dynamo or generator are built into the clutch drum 34 and core 58 so that during such time as relative rotation exists between the core 58 and the drum 34 an electric current will be generated, which current is conducted to the coils of a magnet 140 which is disposed in the bottom of the groove 102 in which the bolt 60 is slidably disposed so that at such time as relative rotation exists between the core and drum of the centrifugally actuated clutch, the magnet 140 will be energized for holding the bolt 60 in its retracted position. So soon as the relative rotation between the clutch drum 34 and core 58 which comprise the stator and rotor, respectively, of a dynamo or generator, is eliminated the generation of electric current will cease and the centrifugal force of the bolt 60 may be operative for moving the same into the bolt-engaging recess 56 for interconnecting the core and drum. The winding of the generator or dynamo has been shown more or less diagrammatically since they as such form no part of the invention. If desired, the coils of the magnet 140 may be connected through suitable conductors 142 and 144 to an outside source of current whereby the magnet 140 may be energized at such time as it is desirable, for the purpose of moving the bolt 60 to its retracted position and out of the bolt-engaging recess 56 to disconnect the core and drum clutch members for breaking the driving connection between the shafts through the centrifugally actuated clutch. The application of the outside source of current to the magnet 140 may be controlled by a suitable switch (not shown), which may be operated either manually or incidental to the operation of some mechanism on an automotive vehicle so that the operator of the same may cut the centrifugally actuated clutch 32 out of the driving connection between the shafts at such times as it may appear desirable.

In the modification disclosed in Figs. 11 and 12, a duct 150 in communication at one end with the bottom of the groove 102 in which the bolt 60 is slidably disposed and at the other end with the space surrounding said centrifugally actuated clutch is provided with a valve 152 which controls the admission of fluid or liquid to that portion of the groove 102 below the bolt 60 which is vacated by the outward movement of the bolt 60 under the action of centrifugal force. It will be appreciated that if the bottom end of the groove 102 is closed that the outward movement of the bolt 60 under the action of centrifugal force tends to create a vacuum below the bolt 60 which would resist such outward movement. The valve 152 comprises a slidable plunger 154 disposed in a transverse bore 156 provided in the body of the core member 38 and biased by a spring 158 backed by an adjustable plug 160. Normally, the plunger 154 is biased to uncover the duct 150 so that communication is afforded between the bottom portion of the groove 102 and the space surrounding the clutch members.

The drum member 34 of the clutch is provided with a plurality of tooth-like formations 162, the ridges of which engage the plunger 154 during such time as relative rotation exists between the clutch drum 34 and the core 58, as a result of which the plunger 154 will be held in a position to cover the duct 150. Whenever the relative rotation between the clutch core 58 and the clutch drum 34 has been eliminated, the plunger 154 will be moved by a spring 158 to uncover the duct 150, thereby permitting the bolt 60 to be moved outwardly under the influence of centrifugal force resulting from the rotation of the core 58.

In all of the modifications of the invention illustrated in the accompanying drawings, the relative rotation which occurs between the clutch drum 34 and the clutch core 58 has been utilized for holding or assisting in holding the bolt 60 in a retracted position until the rotative speeds of the clutch core and drum have been substantially synchronized. While all of the modifications have been shown with a bolt 60 having a tapered or beveled face 76 which also is operable for preventing the movement of the bolt into the bolt-engaging recess until the relative rotation between the clutch members have been substantially eliminated, it will be appreciated that the bolt may be constructed without such beveled or tapered face 76, since the function of keeping the bolt out of the bolt-engaging recess until the speeds of the clutch members have been synchronized may be effectively accomplished in any of the various manners illustrated.

While several specific embodiments of the invention have been illustrated and described, it must be appreciated that many modifications may be made in the construction thereof without departing from the scope of the invention, and for that reason I do not desire to be limited to any particular form or arrangement except in so far as such limitations are included in the following claims.

I claim:

1. In an automatic transmission including an automatically operable centrifugal clutch having members thereof operatively associated with and separately driven by the driving and driven shafts of said transmission, centrifugally operable means operable for connecting said clutch members and provided with means operable for preventing the operation of said centrifugally operable means until the rotative speeds of said clutch members are approximately synchronous, and auxiliary means continuously effective to prevent the operation of said centrifugal clutch until the members thereof while yet separately driven are rotating at a substantially synchronous rate.

2. In an automatic transmission having driving and driven shafts, a speed responsive clutch having a member initially separately driven by each of said shafts and a locking element carried by one of said members and operable responsive to centrifugal force for engaging the other of said members, said locking element being provided with means for preventing the operation thereof until the rotative speeds between said clutch members have been substantially synchronized, and auxiliary means separate from said locking element for utilizing the relative rotation between said core and said drum to create a force and apply the same to said locking element for continuously holding the locking element against movement responsive to centrifugal force until the relative rotation between said clutch members while the latter are separately driven, has substantially been eliminated.

3. A centrifugally actuated clutch structure including a drum member provided with a bolt-engaging recess, a core member nested within said drum member and having mounted thereon a slidable bolt movable in one direction under the influence of centrifugal force for engaging in said recess to lock said clutch members together, one of said clutch members being adapted to be driven initially at a rate different than that of the other of said clutch members, and means separate from said bolt and associated with said core and said drum and operable at such time as said members are rotating at relatively different rates continuously effective to prevent engagement with said recess.

4. A centrifugally actuated clutch structure including a member provided with a bolt-engaging recess, a second member having mounted thereon a bolt movable in one direction under the influence of centrifugal force for engagement with said recess to lock said clutch members together, one of said clutch members being adapted to be driven initially at a rate different than that of the other of said clutch members, detent means operably associated with said second member and said bolt, and means separate from said bolt continuously effective to prevent operative engagement of said bolt with said recess until the rotative speeds of said clutch members have been substantially synchronized, said means being operable only during such time as relative rotation exists between said clutch members.

5. A centrifugally actuated clutch structure including a drum member provided with a bolt-engaging recess, a core member nested within said drum and having mounted thereon a slidable bolt movable in one direction under the influence of centrifugal force resulting from the rotation of said core to engage in said recess for interconnecting said core and said drum, one of said clutch members being driven initially at a rate different than that at which said other clutch member is being driven, and means separate from said bolt for utilizing the relative rotation between said core and said drum to create a continuous force effective to hold said bolt against movement responsive to centrifugal force whereby said bolt will be inoperative to interconnect said drum and said core until the relative rotation between the same has substantially been eliminated.

6. A centrifugally actuated clutch structure including a drum member provided with a bolt-engaging recess, a core member nested within said drum member and having a bolt slidably mounted thereon and movable in one direction under the influence of centrifugal force resulting from the rotation of said core to engage in said recess for interconnecting said core and said drum, said core being adapted to be driven initially at a rate different than that of said drum, and a member carried by said core and rotated by said drum during such time as relative rotation exists between said core and said drum and frictionally acting on said bolt for holding the same against movement responsive to centrifugal force until the relative rotation between said core and said drum has substantially been eliminated.

7. A centrifugally actuated clutch structure including a drum member provided with a bolt-engaging recess, a core member nested within said drum member and being adapted to be driven initially at a rate different than that at which said drum is being driven, a bolt slidably mounted on said core and movable in one direction responsive to centrifugal force resulting from the rotation of said core to engage in said recess for interconnecting said core and said drum, a duct in the body of said core and in communication with the under side of said bolt, and means utilizing the relative rotation between said core and said drum for reducing the pressure within said duct for holding said bolt against movement responsive to centrifugal force whereby said bolt will be inoperative to interconnect said core and said drum until the relative rotation between the same has substantially been eliminated.

8. In a device of the class described, the combination of a clutch drum member and a core member nested within said drum, said members being adapted to be separately driven initially at different rates, said drum being provided with a driving shoulder, and said core being provided with a bolt movable under the influence of centrifugal force resulting from the rotation of said core to engage said shoulder whereby said members will rotate together, spring means acting on said bolt for holding the same in an inoperative position until the speed of rotation of said core attains a predetermined rate independently of any rotative influence by said drum, and cooperating means provided on said core and said drum and operable responsive to the relative rotation between the same for acting on said bolt to hold the same in an inoperative position without regard to the speed of rotation of said core.

9. In a device of the class described, the combination of a clutch drum member and a core member nested within said drum, said members being adapted to be driven initially at different rates, said drum being provided with a driving shoulder, and said core being provided with a bolt movable under the influence of centrifugal force resulting from the rotation of said core to engage said shoulder whereby said members will rotate together, spring means acting on said bolt for holding the same in an inoperative position until the speed of rotation of said core attains a predetermined rate, an electro-magnet mounted on said core and acting on said bolt for holding the same against movement under the action of centrifugal force, and electric current generating means carried by said core and said drum and operable during the relative rotation between the same and connected to said magnet for energizing the same.

10. In a device of the class described, the combination of a clutch drum member and a core member nested within said drum, said members being adapted to be driven initially at different rates, said drum being provided with a driving shoulder, and said core being provided with a bolt movable under the influence of centrifugal force resulting from the rotation of said core to engage said shoulder whereby said members will rotate together, springs means acting on said bolt for holding the same in an inoperative position until the speed of rotation of said core attains a predetermined rate, an electro-magnet mounted on said core and acting on said bolt for holding the same against movement under the action of centrifugal force, electric current generating means carried by said core and said drum and operable during the relative rotation between the same and connected to said magnet for energizing the same, and means for connecting said magnet to an outside source of current for moving said bolt out of engagement with said shoulder and against centrifugal force to break the direct connection between said clutch members.

11. A centrifugally actuated clutch structure including a drum member provided with a bolt-engaging recess, a core member nested within said drum member and having a bolt slidably mounted thereon and movable in one direction under the influence of centrifugal force resulting from the rotation of said core to engage in said recess for interconnecting said core and said drum, said core being adapted to be driven initially at a rate different than that of said drum, and a rotatable member operably associated with said core and said drum and operable during such time as relative rotation exists therebetween for preventing movement of said bolt responsive to centrifugal force.

12. Transmission mechanism including a centrifugally operable clutch comprising clutch members arranged to be separately driven by the driving and driven shafts of said transmission mechanism while said clutch members are declutched, and for establishing a direct driving connection between said shafts when said clutch members are clutched, centrifugally operable means for connecting said clutch members, and means actuated by said clutch members while the latter are separately rotated at different rotative speeds continuously effective to prevent the operation of said centrifugally operable means and which becomes ineffective to prevent operation of said centrifugally operable means when said clutch members, while yet separately driven, are caused to rotate at a substantially synchronous rate.

13. Transmission mechanism including a centrifugally operable clutch comprising clutch members arranged to be separately driven by the driving and driven shafts of said transmission mechanism while said clutch members are declutched, and for establishing a direct driving connection between said shafts when said clutch members are clutched, centrifugally operable means for connecting said clutch members, and means actuated by said clutch members while the latter are separately rotated at different rotative speeds for preventing the operation of said centrifugally operable means and which becomes ineffective to prevent operation of said centrifugally operable means when said clutch members, while yet separately driven, are caused to rotate at a substantially synchronous rate, said last named means including a rotary element carried by one clutch member and operatively engaged with the other clutch member and said centrifugally operable means.

REX E. KELLER.